United States Patent

Andresen et al.

(10) Patent No.: US 9,133,825 B2
(45) Date of Patent: Sep. 15, 2015

(54) POWER OSCILLATION DAMPING BY A CONVERTER-BASED POWER GENERATION DEVICE

(75) Inventors: Björn Andresen, Ostbirk (DK); Michael Noertoft Frydensbjerg, Give (DK); Thyge Knüppel, Copenhagen N (DK)

(73) Assignee: SIEMENS AKTIENGESELLSCHAFT, München (DE)

(*) Notice: Subject to any disclaimer, the term of this patent is extended or adjusted under 35 U.S.C. 154(b) by 134 days.

(21) Appl. No.: 13/825,388

(22) PCT Filed: Jan. 19, 2011

(86) PCT No.: PCT/EP2011/050687
§ 371 (c)(1),
(2), (4) Date: May 30, 2013

(87) PCT Pub. No.: WO2012/041527
PCT Pub. Date: Apr. 5, 2012

(65) Prior Publication Data
US 2014/0361537 A1 Dec. 11, 2014

(30) Foreign Application Priority Data
Sep. 28, 2010 (EP) .................................... 10181108

(51) Int. Cl.
*H02J 3/24* (2006.01)
*F03D 9/00* (2006.01)
(Continued)

(52) U.S. Cl.
CPC . *F03D 9/005* (2013.01); *H02J 3/24* (2013.01); *H02J 3/386* (2013.01); *H02P 9/02* (2013.01); *Y02E 10/763* (2013.01)

(58) Field of Classification Search
USPC ........................................................... 290/44
See application file for complete search history.

(56) References Cited

U.S. PATENT DOCUMENTS 7,423,412 B2 * 9/2008 Weng et al. ..................... 322/20
2007/0279012 A1 * 12/2007 Sihler .............................. 322/20
(Continued)

FOREIGN PATENT DOCUMENTS

CN 101101039 A 1/2008
CN 101557191 A 10/2009
(Continued)

OTHER PUBLICATIONS

Isamu Osada et al: Development of Gearless Variable-Speed Wind Turbine, Mitsubishi Heavy technical review; vol. 38 No. 2, pp. 100-103; 2001; JP.

*Primary Examiner* — Joseph Waks

(57) ABSTRACT

There is provided a power generation park (100) having a power output (108) for providing electrical output power (150) to an electricity network (128). A power generation device (102a, ... 102n) has a converter device (106) configured for receiving input power (142) from a power generator (104) and providing, in response thereto, the electrical output power (150) to the power output (112). The power generation park (100) also has a controller (122) being configured for receiving an oscillation indicating signal (126) indicative of a power oscillation in the electricity network (108), the controller (122) being further configured for providing a damping control signal (132) in response to the oscillation indicating signal (126); the converter device (106) being configured for modulating the electrical output power (150) in response to the damping control signal (132) so as to damp the power oscillation in the electricity network (128).

10 Claims, 5 Drawing Sheets

(51) Int. Cl.
*H02J 3/38* (2006.01)
*H02P 9/02* (2006.01)

(56) References Cited

U.S. PATENT DOCUMENTS

| | | | |
|---|---|---|---|
| 2010/0013235 A1* | 1/2010 | Bjerge et al. | 290/55 |
| 2010/0052322 A1 | 3/2010 | Fortmann | |
| 2010/0109444 A1* | 5/2010 | Lemmens | 307/104 |
| 2010/0109447 A1* | 5/2010 | Achilles et al. | 307/153 |
| 2011/0109085 A1* | 5/2011 | Nelson | 290/44 |
| 2013/0175871 A1* | 7/2013 | Knuppel et al. | 307/102 |

FOREIGN PATENT DOCUMENTS

| | | | |
|---|---|---|---|
| CN | 101600880 A | | 12/2009 |
| CN | 101629554 A | | 1/2010 |
| CN | 10725480 A | | 6/2010 |
| DE | 3206598 A1 | * | 9/1983 |
| DE | 10228062 A1 | * | 1/2004 |
| DE | 102007002102 | * | 7/2007 |
| DE | 102007005165 | * | 8/2007 |
| EP | 2182207 A2 | | 5/2010 |
| JP | H119000 A | | 1/1999 |
| JP | 2003111279 A | | 4/2003 |
| JP | 2004153941 A | | 5/2004 |
| JP | 2007159311 A | | 6/2007 |
| JP | 2010515417 A | | 5/2010 |
| JP | 2010187482 A | | 8/2010 |
| JP | 2011009000 A | | 1/2011 |
| WO | WO 9737236 A1 | * | 10/1997 |

* cited by examiner

POWER OSCILLATION DAMPING BY A CONVERTER-BASED POWER GENERATION DEVICE

CROSS REFERENCE TO RELATED APPLICATIONS

This application is the US National Stage of International Application No. PCT/EP2011/050687, filed Jan. 19, 2011 and claims the benefit thereof. The International Application claims the benefits of European Patent Office application No. 10181108.1 EP filed Sep. 28, 2010. All of the applications are incorporated by reference herein in their entirety.

The present invention relates to the field of converter-based power generation devices, i.e. power generation devices which include a converter. In particular, the present invention relates to the field of wind turbine devices.

ART BACKGROUND

Power oscillations typically occur in large interconnected power systems, where two or more areas are interconnected through relatively weak alternating current (AC) transmission lines. These power oscillations are also referred to as interarea oscillations. Whether or not an oscillation is stable or unstable is a system property. Hence it is not the contingency initiating the oscillation that determines the necessary level of damping. Rather, the necessary level of damping depends on the state of the power system, i.e. operating condition, controller tuning, transmission lines, the generators in service, etc.

If a power oscillation between two areas of a power system is excited, the rotor angles of synchronous machines in one area will start to oscillate in counter phase with synchronous machines in the other area and thereby force a flow of active power back and forth between the areas. If the oscillation is sufficiently damped the oscillation will die out and the rotor angles return to a steady state. However, if there is insufficient damping in the power system for this particular oscillation an ever increasing amount of active power is exchanged between the two areas until other security devices, e.g. synchronous machine or transmission line safety equipment, trip the unit or component. A cascading effect of equipment tripping and ultimately a system black out can be the consequence.

In known electricity networks, the majority of the necessary damping torque is delivered by synchronous machines equipped with power system stabilizers (PSS). As it is known from practice, such stabilizing controllers are installed when a new power station is constructed. A PSS may also be retrofitted to existing power plants. A basic concept of a known PSS is to add an auxiliary signal to the voltage reference of the exciter and thereby modulate the excitation voltage of the synchronous machine to damp the power oscillations.

In view of the above described situation there exists a need for an improved technique that enables to damp power oscillations in an electricity network.

SUMMARY OF THE INVENTION

This need may be met by the subject-matter according to the independent claims. Advantageous embodiments of the herein disclosed subject-matter are described by the dependent claims.

According to a first aspect of the herein disclosed subject-matter, a power generation device is provided, the power generation device comprising: a power generator; a converter device having a power output for providing electrical output power to an electricity network; the converter device being configured for receiving input power from the power generator and providing, in response hereto, the electrical output power at the power output; the converter device being configured for modulating the electrical output power in response to a damping control signal so as to damp the power oscillation in the electricity network.

This aspect is based on the idea that by modifying a converter based power generation device for damping of power oscillations in an electricity network enhanced damping characteristics in regard of power oscillations in an electricity network may be achieved. A converter-based power generation device has the advantage that active and reactive power can be independently controlled and a controller in accordance with the herein disclosed subject-matter therefore may, according to an embodiment, use both, the control of active and the control of the reactive power for better damping performance. Generally, the active power is provided by the rotational energy of wind turbine mechanical system which in turn is provided by the wind forces acting on the blades of the wind turbine.

As used herein, a converter device is a device for converting electrical input power to an electrical output power. For example, in an embodiment the converter is configured for changing an electrical characteristic of the electrical input power, thereby generating the electrical output power. In an embodiment, the converter is configured for converting electrical direct current (DC) power into electrical alternating current (AC) power.

According to an embodiment, "the converter device being configured for modulating the electrical output power in response to the damping control signal" means that the converter device is configured for providing the electrical output power in a modulated form wherein the modulation is dependent on the damping control signal.

According to an embodiment, the damping control signal includes an active component control signal for controlling an active component of the electrical output power. Accordingly, in an embodiment the converter device is configured for controlling the active component of the electrical output power. According to an embodiment, the active component of the electrical output power is the active power of the electrical output power. According to a further embodiment, the active component is the active current of the electrical output power.

According to a further embodiment, the damping control signal includes a reactive component control signal for controlling a reactive component of the electrical output power. Accordingly, in an embodiment the converter device is configured for controlling the reactive component of the electrical output power. According to an embodiment, the reactive component of the electrical output power is the reactive power of the electrical output power. According to a further embodiment, the reactive component is the reactive current of the electrical output power.

As exemplarily indicated in the preceding paragraphs, generally herein any reference to an active power may be replaced by a reference to the respective active current, thereby resulting in a respectively amended embodiment. Likewise, generally herein any reference to a reactive power may be replaced by a reference to the respective reactive current, thereby resulting in a respectively amended embodiment.

In an embodiment, the controller is configured for providing both the control signal for controlling the active component as well as the control signal for controlling the reactive component of the electrical power. Accordingly, the converter device may be configured for controlling both, active and reactive power.

According to an embodiment, the power generation device comprises a controller being configured for receiving an oscillation indicating signal indicative of a power oscillation in the electricity network, the controller being further configured for providing the damping control signal in response to the oscillation indicating signal. According to other embodiments, the controller is not part of the power generation device.

According to an embodiment of the herein disclosed subject matter, the controller comprises first subcontroller for controlling an active component of the electrical output power and a second subcontroller for controlling a reactive component of the electrical output power. Two parallel controllers, of which one is provided for controlling the active component and the other is provided for controlling the reactive component of the electrical output power, have the advantage that the control of the active component and the reactive component can be performed independently. However, it should be understood that any control is possible only within the various limits of the components of the power generation device.

However, some power generation devices in accordance with embodiments of the herein disclosed subject-matter operate with an energy source free of charge, for example wind or solar energy. At least in such a case the power generation device is preferably operated so as to deliver the maximum available power. In other words, at least in such a case it may be desirable to minimize any lost production of power caused by the delivery of damping power for damping the power oscillations in the electricity network.

According to an embodiment, the controller is configured for decreasing, in response to the oscillation indicating signal, a reference value of the active power to be provided by the converter. The reduced reference value of the active power provides the possibility of modulating the electrical output power without exceeding the rated active power of the power generator. For example, if the power generator is a rotary machine, such an embodiment, where the reference value of the active power is decreased in response to the oscillation indicating signal, the speed control of the rotary machine does not need to be changed.

In an embodiment of the herein disclosed subject-matter the power generation device comprises a rotary machine, the rotary machine having a rotation element; and the converter device is configured for modulating the electrical output power in response to the damping control signal so as to change the rotational energy of the rotation element. For example, in an embodiment, the rotation of the rotation element is used as a storage from which power can be drawn and to which power can be provided. In a further embodiment, the controller is configured for providing a damping control signal which is configured so as to drive the converter device to exchange power between the electricity network and the rotary machine by changing the rotational energy of the rotation element of the rotary machine.

According to a further embodiment the controller comprises an input for receiving the oscillation indicating signal. Further, a sensor may be provided, the sensor being configured for sensing power oscillations in the electricity network and providing in response hereto the oscillation indicating signal. According to an embodiment, the oscillation indicating signal may be a local signal which is generated locally at the power generation device or in the area of a power generation park which comprises two or more power generation devices. In such an embodiment, the oscillation sensor is located locally at the power generation device or in the area of the power generation park. According to another embodiment, the oscillation indicating signal is an external signal which is received from outside the power generation device or from outside of the power generation park. For example, in an embodiment the oscillation sensor is located in the electricity network (such as an external grid) for providing the external oscillation indicating signal. According to a further embodiment, two or more oscillation sensors are provided, which alternatively or simultaneously may be connected to the controller. According to an embodiment, the oscillation sensor provides a raw input signal which is further conditioned, e.g. by at least one appropriate filter, to thereby provide the oscillation indicating signal. Such filter(s) may be located in the power generation device or in the controller. According to other embodiments, such filter(s) are located external to the power generation device or external to the power generation park.

According to an embodiment, the power generation device is a wind turbine device. For example, in an embodiment the wind turbine device comprises a power generator in the form of an electrical rotary machine.

According to an embodiment, a method of operating a power generation device having a converter is provided, the method comprising receiving input power from a power generator and providing, in response hereto, electrical output power to an electricity network; receiving an oscillation indicating signal indicative of a power oscillation in the electricity network; and selectively modulating at least one of an active component and a reactive component of the electrical output power by means of the converter depending on the oscillation indicating signal so as to damp the power oscillation in the electricity network.

According to a second aspect of the herein disclosed subject-matter, a power generation park is provided, the power generation park having at least two power generation devices. In accordance with an embodiment, at least one power generation device of the power generation park is configured according to the first aspect or an embodiment or example thereof.

According to an embodiment, the power generation park further comprising: a controller being configured for receiving an oscillation indicating signal indicative of a power oscillation in the electricity network, the controller being further configured for providing the damping control signal in response to the oscillation indicating signal. Hence, in contrast to an embodiment described with regard to the first aspect, where the controller is part of the power generation device, in the aforementioned embodiment of the power generation park the controller is part of the power generation park. However, the controller may be configured in accordance with any embodiment described herein. Further, according to an embodiment, the controller is configured for providing the damping control signal to a single power generation device, or, in another embodiment, to two or more power generation devices.

According to a third aspect of the herein disclosed subject-matter, a controller for a power generation device is provided, the controller comprising: an input for receiving an oscillation indicating signal indicative of a power oscillation in an electricity network; an output for providing a damping control signal to a converter device in response to the oscillation indicating signal; the damping control signal being configured so as to drive the converter device to modulate an electrical output power of the power generation device and thereby damp the power oscillation and the electricity network. According to embodiments of the third aspect, the controller is configured as described with regard to the first aspect or an example thereof.

In accordance with an embodiment, the controller is associated with a single power generation device. According to another embodiment, the controller is associated with at least two power generation devices. In both embodiments, the first and the second embodiments the controller may be part of a power generation park. Further, the controller may also be part of a power generation device, also in both embodiments.

According to a fourth aspect, a method of operating a controller of a converter device configured for providing an electrical output power to an electricity network is provided, the method comprising: receiving an oscillation indicating signal, indicative of a power oscillation in the electricity network; providing a damping control signal to the converter device in response to the oscillation indicating signal; the damping control signal being configured so as to drive the converter device to modulate the electrical output power of the converter device and thereby damp the power oscillation in the electricity network.

According to an embodiment, the method further comprises decreasing, in response to the oscillation indicating signal, a reference value of an active power to be provided by the converter.

According to a further embodiment, the damping control signal is provided so as to drive the converter device to exchange power between the electricity network and a rotary machine of the power generation device by changing the rotational energy of a rotation element of the rotary machine.

According to further embodiments of the fourth aspect, functions as disclosed in regard to the first aspect are performed. However, it should be understood that according to embodiments of the fourth aspect, such functions are not limited to the device features in conjunction with which the functions have been disclosed with regard to the first aspect.

According to a fifth aspect of the herein disclosed subject-matter, a computer program for processing a physical object, namely an oscillation indicating signal, is provided, the computer program, when being executed by a data processor device, is adapted for controlling the method according to the fourth aspect or an embodiment or example thereof.

According to an illustrative embodiment, the power generation device is a wind power device. In the following, there are described exemplary aspects and embodiments with regard to a wind power system. It should be noted that although reference is made to a wind power system or a wind turbine device, the respective functions and device features are as well as applicable to other power generation devices.

According to an aspect of the herein disclosed subject-matter, a wind power device is provided, the wind power device being arranged for damping of power oscillations in an electricity network, the wind power device comprising: a wind turbine generator operable to supply electrical output power originating from wind power to a grid at least partially via a converter; a measuring device configured for a measurement, e.g. continuous measurement, of power oscillations, wherein the power oscillations are a result of an exchange of power between two or more power generating synchronous machines connected to a grid; and a controller, herein after referred to as damping controller, connected to the measuring device and arranged to modulate the output power (e.g., according to an embodiment, active and/or reactive power) of the wind turbine generator, where the output power is modulated in response to the measured power system oscillations in order to damp the power oscillations. According to an embodiment, the controller is integrated into the converter.

According to a further embodiment, the wind turbine park comprises a plurality of wind turbine devices, e.g. arranged in a wind park (sometimes also referred to as wind farm), where the damping controller is arranged to calculate an auxiliary damping signal and transmit the auxiliary damping signal to individual device controllers of each of the individual wind turbine devices; and wherein the controller is arranged to control the output power of the wind turbine generator in response to the auxiliary damping signal.

According to an embodiment, the damping controller is configured for increasing and/or decreasing the rotational speed of the wind turbine generator in order to utilize the rotational energy that is stored in the mechanical system for damping the power system oscillations.

According to a further embodiment, the damping controller comprises two parallel controllers of which a first controller is configured to calculate an active power modulation signal and the second controller is configured for calculating a reactive power modulation signal for independent and parallel damping control of active and reactive power.

According to a further embodiment, the measuring device is one of a rotational sensor (e.g. RPM sensor), a current detector, a voltage detector, a frequency detector, an active power detector, a reactive power detector, etc.

According to a further embodiment, the wind park comprises a plurality of measuring devices that are located in the electricity network (e.g. the grid).

According to a further embodiment, the measuring device is located in proximity to one of the power generating synchronous machines and/or at a point of common connection of the wind park.

According to a further embodiment, the measuring device and the damping controller are connected to each other, e.g. by a high-speed communication link.

According to a further embodiment, the wind turbine is a variable speed wind turbine comprising a synchronous or an asynchronous generator that is connected to the electricity network via the converter. According to an embodiment, the converter is a full-scale converter. The full-scale converter setup does not require a synchronous generator.

According to a further embodiment, the wind turbine device is a variable speed wind turbine device comprising a doubly-fed induction generator (DFIG) that is connected to the electricity network via a partial converter solution. For example, in an embodiment, a first part of the output power of the doubly-fed induction generator is provided to the electricity network directly and a second part of the output power of the doubly-fed induction generator is provided to the electricity network via a converter. This allows the use of a doubly-fed induction generator while still allowing to implement aspects and embodiments and examples of the herein disclosed subject-matter.

According to an embodiment, a method of damping power oscillations in a power system comprising at least one wind turbine device comprises: determining power oscillations in the power system; controlling and/or altering the output power of at least one wind turbine device according to the determined power oscillations in the electricity network (i.e. according to the oscillation indicating signal in one embodiment) in such a way that the power oscillations in the power system are actively damped.

According to an embodiment, the method for damping power oscillations comprises: calculating an auxiliary damping signal based on the determined power oscillations in the electricity network by using at least one of the operations filtering, phase compensation, scaling. According to a further embodiment, the method for damping power oscillations comprises adding the auxiliary damping signal to a reference signal which reference signal is used by a controller of the wind turbine device in order to control the output power of the wind turbine device.

According to a further embodiment, the reference signal is one of rotor speed reference, generator speed reference, power reference, voltage reference, current reference, active power reference, reactive power reference, torque reference.

According to an embodiment, the controller is configured for damping power oscillations in a no load condition of the wind turbine device. According to an embodiment, the method for damping power oscillations comprises determining power oscillations in a power system; and controlling and modulating the reactive output power of a wind turbine device using a converter (e.g. a grid inverter in one embodiment) according to the determined power oscillations such that the power oscillations are actively damped when the wind turbine device is not producing and delivering active power to the electricity network.

As used herein, reference to a computer program is intended to be equivalent to a reference to a program element and/or a computer readable medium containing instructions for controlling a computer system to coordinate the performance of the above described method.

The computer program may be implemented as computer readable instruction code by use of any suitable programming language, such as, for example, JAVA, C++, and may be stored on a computer-readable medium (removable disk, volatile or nonvolatile memory, embedded memory/processor, etc.). The instruction code is operable to program a computer or any other programmable device to carry out the intended functions. The computer program may be available from a network, such as the World Wide Web, from which it may be downloaded.

Embodiments of the herein disclosed subject matter may be realized by means of a computer program respectively software. However, embodiments of the herein disclosed subject matter may also be realized by means of one or more specific electronic circuits respectively hardware. Furthermore, embodiments of the herein disclosed subject matter may also be realized in a hybrid form, i.e. in a combination of software modules and hardware modules.

In the above there have been described and in the following there will be described exemplary embodiments of the subject matter disclosed herein with reference to a power generation device, a power generation park, a controller of a power generation device, a method of operating a power generation device, a wind power device and a method of damping power oscillations. It has to be pointed out that of course any combination of features relating to different aspects of the herein disclosed subject matter is also possible. In particular, some embodiments have been described with reference to apparatus type claims whereas other embodiments have been described with reference to method type claims. However, a person skilled in the art will gather from the above and the following description that, unless other notified, in addition to any combination of features belonging to one aspect also any combination between features relating to different aspects or embodiments, for example even between features of the apparatus type claims and features of the method type claims is considered to be disclosed with this application.

The aspects and embodiments defined above and further aspects and embodiments of the present invention are apparent from the examples to be described hereinafter and are explained with reference to the drawings, but to which the invention is not limited.

DETAILED DESCRIPTION

Figure 1:
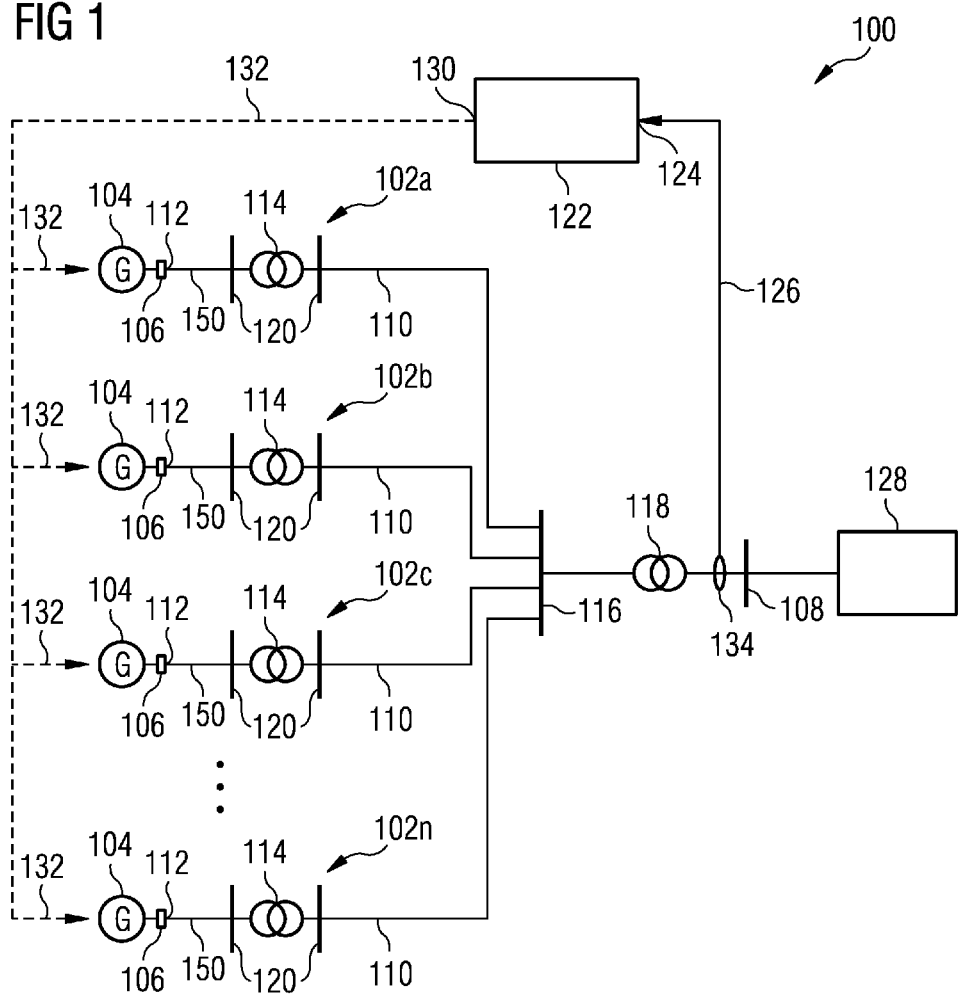
FIG. 1 shows a power generation park 100 in accordance with embodiments of the herein disclosed subject-matter.

The illustration in the drawings is schematic. It is noted that in different figures, similar or identical elements are provided with the same reference signs or with reference signs, which are different from the corresponding reference signs only within the first digit or an appended character.

FIG. 1 shows a power generation park 100 in accordance with embodiments of the herein disclosed subject-matter.

The power generation park 100 comprises at least two, e.g. n power generation devices 102a, 102b, 102c . . . 102n. At least one of the power generation devices 102a-102n is configured according to embodiments of the herein disclosed subject-matter. For example, in an embodiment all power generation devices 102a-102n are configured according to embodiments of the herein disclosed subject-matter.

The power generation park 100 in FIG. 1 is, in accordance with an embodiment, a wind park and the power generation devices 102a-102n are wind turbine devices. Each wind turbine device 102a-102n comprises a power generator 104 which receives mechanical energy from the wind turbine blades (not shown in FIG. 1) and generates in response to the received mechanical energy electrical energy. The electrical energy is then fed to a converter device 106 as an input power. To this end, the power generator 104 may be electrically coupled to the converter device 106. The converter device 106 provides in response to the input power received from the power generator 104 an electrical output power 150 to be provided to a power output 108 of the wind park 100. The electrical output power 150 is transformed by a device transformer 114 of the wind turbine device 102a-102n. In an embodiment, the converter device 106 is electrically coupled to the power output 108 of the wind park 100 via a coupling path 110. According to an embodiment, the power output 108 of the wind park is the point of common connection of the wind park. According to a further embodiment, an electrical characteristic of the output power 150 provided by the converter device 106 is changed before the output power is fed to the power output 108. For example, in accordance with an embodiment one or more transformers are provided in the electrical coupling path 110 which couples an output 112 of the converter device 106 to the power output 108. For example, according to an embodiment shown in FIG. 1, a device transformer 114 is electrically coupled between the output 112 of the converter device 106 and a bus bar 116 which in turn is coupled to a park transformer 118. The park transformer is coupled to the power output 108 of the wind park 100. Instead of a bus bar 116, any other suitable power connection arrangement may be used. According to an embodiment, the device transformer 114 is part of the wind turbine device. In other embodiments, the device transformer is separate from the wind turbine device.

It should be mentioned that other elements may be included in the electrical coupling path and that the term "electrical coupling" does not exclude intermediate entities between the coupled entities. For example, in an embodiment the electrical coupling path 110 includes a circuit breaker (not shown).

According to an embodiment, the electrical coupling between the converter device 106 and the bus bar 116 is done by interfaces, generally indicated at 120 in FIG. 1. According to an embodiment, the interfaces 120 are electrical lines.

According to an embodiment, the wind park 100 comprises a controller 122, the controller 122 having an input 124 for receiving an oscillation indicating signal 126 indicative of a power oscillation in an electricity network, e.g. an external grid 128. The controller further comprises an output 130 for providing a damping control signal 132 to at least one of the converter devices 106 in the wind park, e.g. to all converter devices of the wind park as shown in FIG. 1. The damping control signal 132 is provided in response to the oscillation indicating signal 126. Further, the damping control signal 132 is configured so as to drive the converter device 106 to modulate an electrical output power of the power generation device and thereby damp the power oscillation in the electricity network 128. The converter device 106 is configured for modulating the electrical output power in response to the damping control signal 132 so as to damp the power oscillation in the electricity network 128.

In accordance with an embodiment, a measuring device 134 is provided, the measuring device 134 being configured for providing the oscillation indicating signal 126 or a precursor signal thereof.

In FIG. 1, the same damping control signal is provided to each of the wind turbine devices. According to other embodiments not shown in FIG. 1, the controller 122 provides an individual damping control signal to each wind turbine device.

Figure 2:
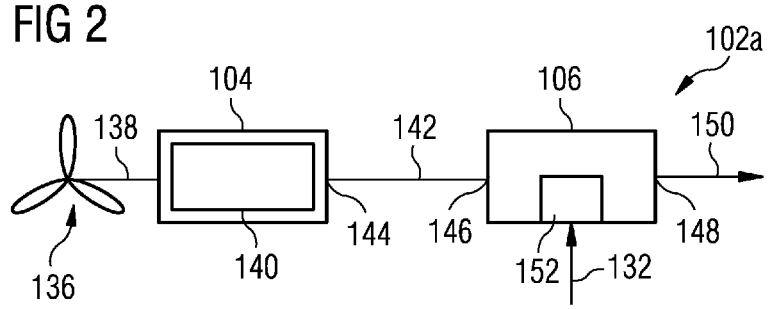
FIG. 2 shows a power generation device in accordance with embodiments of the herein disclosed subject-matter.

FIG. 2 shows a power generation device 102 in accordance with embodiments of the herein disclosed subject-matter. In particular, FIG. 2 shows a part of the wind turbine device 102a of FIG. 1 in more detail. It should be understood, that in embodiments, one or more of the other wind turbine devices 102b-102n are configured similar or identical to the wind turbine device 102a.

The wind turbine device 102a comprises a rotor 136 which is mechanically coupled or coupleable to the power generator 104, e.g. by means of a shaft 138 or a gear unit (not shown). According to an embodiment, the power generation device 104 comprises, e.g. consists of, a rotary machine having a rotation element 140. The shaft 138 is coupled or coupleable to the rotation element 140 for rotating the rotation element 140 and thereby allowing the power generation device 104 to generate electrical power 142 at an output 144 thereof. In accordance with an embodiment, the converter device 106 has an input 146 for receiving the electrical power 142 from the power generator 104. Further, the converter device 106 comprises the output 112 for providing the electrical output power 150.

In accordance with an embodiment, the converter device 106 comprises a device controller 152 which receives the damping control signal 132 and controls in response hereto elements, e.g. semiconductor elements, of the converter device 106. In accordance with an embodiment, the device controller 152 is also configured for control of the power generator 104. Although the device controller 152 is shown as being included in the converter device 106 in FIG. 2, it should be noted that this is only exemplary and that in other embodiments the device controller 152 is a separate controller while still providing the functions as disclosed herein. Hence, irrespective where the device controller 152 is located spatially, it may be considered as being functionally included in and/or associated with the converter device 106. This however does not exclude that the device controller 152 controls other elements of the wind turbine device. Rather, in an embodiment, the device controller 152 further controls the speed reference of the rotation element 140 as is described later with regard to FIG. 6 and FIG. 7.

According to an embodiment shown in FIG. 1, the controller 122 (which may also be referred to as damping controller) is part of the wind park and provides at least one wind turbine of the wind park with the damping control signal.

In another embodiment, the damping controller 122 is included in a single wind turbine device. For example, in an embodiment, the functionality of the damping controller 122 is included in the device controller 152.

Figure 3:
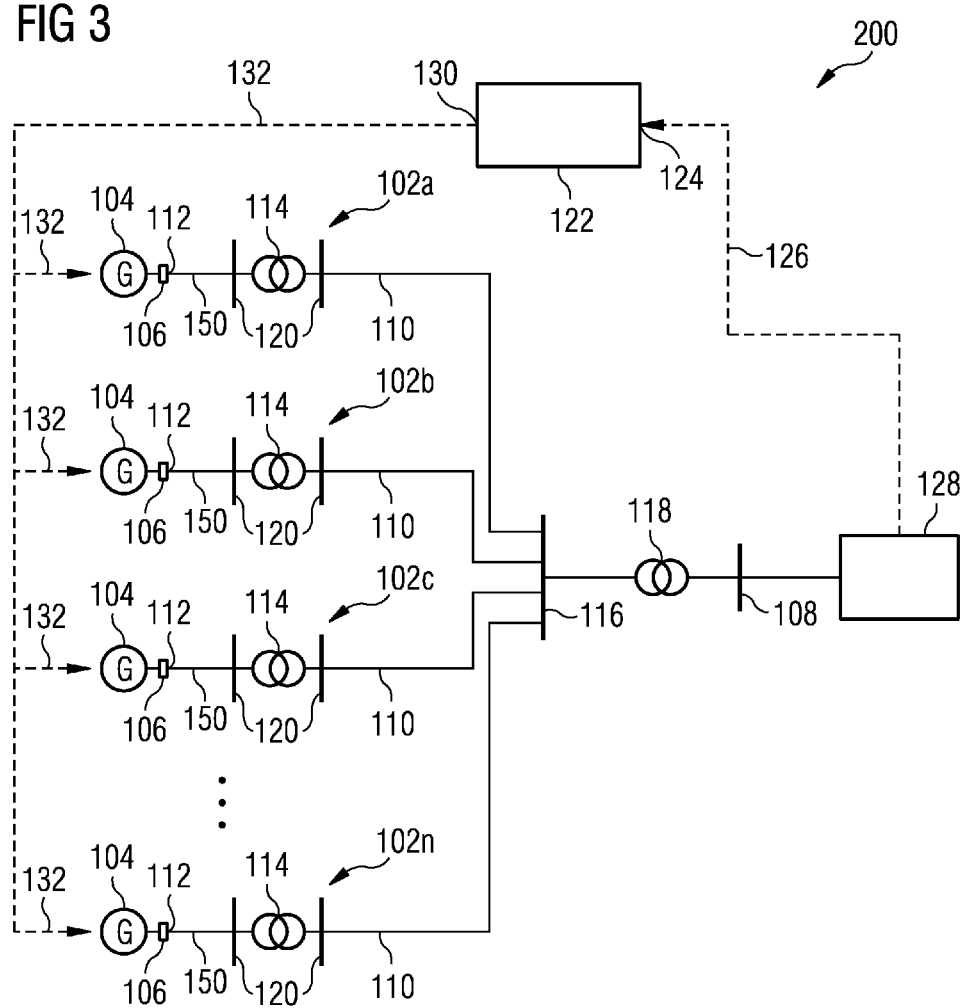
FIG. 3 shows a further wind park 200 which is in accordance with embodiments of the herein disclosed subject-matter.

FIG. 3 shows a wind park 200 which is in accordance with embodiments of the herein disclosed subject-matter.

The wind park 200 is similar to the wind park 100 of FIG. 1 except that the oscillation indicating signal 126 is an external oscillation indicating signal which is received from the electricity network 128. The other components of the wind park 200 are configured similar or identical to the respective components of the wind park 100 in FIG. 1 and the repeated description thereof is omitted.

According to another embodiment (not shown), two or more measuring devices (configured e.g. as the measuring device 134) are provided. In an embodiment, a switch is provided for selectively switching one of the measuring devices 134 to the input 124 of the controller 122. According to an embodiment, at least one measuring device is located in the wind park, as shown in FIG. 1, whereas at least one further measuring device is located in the electricity network 128.

Figure 4:
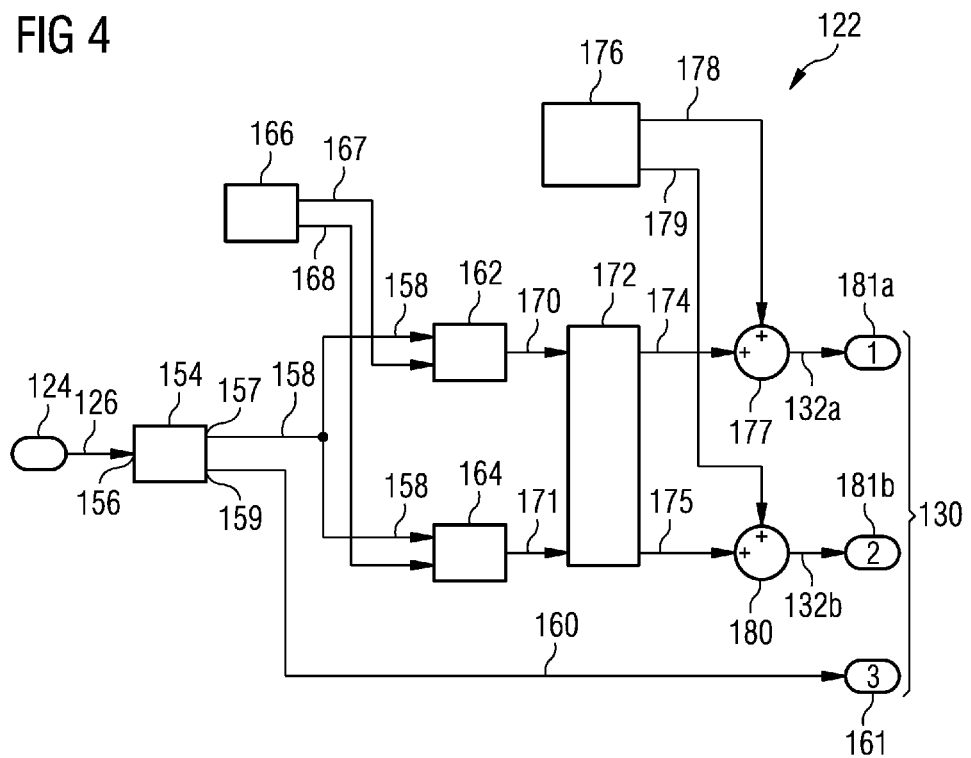
FIG. 4 shows the controller 122 of FIG. 1 and FIG. 2 in more detail.

FIG. 4 shows the controller 122 of FIG. 1 and FIG. 2 in greater detail.

In accordance with an embodiment, the controller 122 comprises an input 124 for receiving the oscillation indicating signal 126. The oscillation indicating signal is provided to an input conditioning unit 154 having an input 156 for receiving the oscillation indicating signal 126 and an output 157 for providing a conditioned oscillation indicating signal 158. According to an embodiment, the input conditioning unit 154 comprises a flag output 159 for providing an oscillation flag 160 at the output 130 of the controller 122, e.g. to a flag terminal 161 of the controller 122. According to an embodiment, the oscillation flag 160 is provided so as to indicate to the power generation device 102a, 102b, 102c, . . . , 102n whether or not there is a power oscillation in the electricity network.

In accordance with an embodiment, the controller 122 comprises a first subcontroller 162 and a second subcontroller 164, wherein the first subcontroller 162 is configured for controlling an active component of the electrical output power and the second subcontroller 164 is configured for controlling a reactive component of the electrical output power. According to an embodiment, the first subcontroller 162 comprises a filter and/or a limiter for stabilization of the active power. According to a further embodiment, the second subcontroller 164 comprises a filter and/or a limiter for stabilization of the reactive power.

Depending on the physical location of the damping device, i.e. the electrical location in terms of the critical oscillation, the best damping performance may be obtained with a combination of active and reactive power modulation. A wind park has the advantage of independent control of active and reactive power and an oscillation damping controller on a wind park can hence use both for better damping performance. According to an embodiment, an overall controller 122 is used to weigh the stabilizing action between active and reactive power modulation. The controller 122 can be on wind park level or on wind turbine level. If the controller 122 is on wind park level, it distributes the reference signals for active and reactive power to the wind turbines, as shown in FIG. 1 and FIG. 3. On wind turbine level, the controller provides the reference signals for active and reactive power only to the wind turbine device associated with the controller.

In accordance with embodiments of the herein disclosed subject-matter, the limits imposed by the first subcontroller 162 and the second subcontroller 164 are fixedly predefined. According to another embodiment, the limits are computed dynamically based on the operation of the wind turbine. According to other embodiments, the limits are variable and may be set e.g. by a limiting unit 166. According to an embodiment, the limiting unit 166 provides at least one first limit 167 to the first subcontroller 162 and at least one second limit 168 to the second subcontroller 164.

It should be understood, that the first limit 167 and the second limit 168 are shown only exemplary and that two or more limits may be set by the limiting unit 166 for each subcontroller 162, 164.

In response to the at least one limit 167 and the conditioned oscillation indicating signal 158, the first subcontroller provides a first response signal 170 indicating a set point for the modulation of the electrical output power, the modulation being suitable for damping the power oscillation indicated by the oscillation indicating signal 126 in the electricity network 128. In accordance with embodiments shown in FIG. 4, the first response signal 170 provides a modulation set point for the active power. Likewise, a corresponding second response signal 171, indicating a modulation set point for the reactive power is provided by the second subcontroller 164.

In an embodiment, the response signals 170, 171 of the first and second subcontroller 162, 164 correspond to (or are included in) the damping control signal 132. In other embodiments, the response signals 170, 171 generated by the first subcontroller 162 and the second subcontroller 164 are further processed to obtain the damping control signal 132. In this regard it should be mentioned, that generally herein the damping control signal 132 is not necessarily a single signal but may include in an embodiment two or more signals provided in parallel.

According to an embodiment, the response signals 170 and 171 of the subcontrollers 162, 164 are received by a weighting unit 172 which performs a weighting function on each of the active power response signal 170 and the reactive power response signal 171. A result of the weighting function is a weighted response signal 174 for the active power (P) and a weighted response signal 175 for the reactive power (Q). For example, in an embodiment the weighting function for the active power P takes into account the response signal 171 for the reactive power Q. Likewise, in a respective embodiment the weighting function for the reactive power Q takes into account the response signal 170 of the active power P. The weighing function is a convenient way to shift between active and reactive damping power without modifying the control loops 162, 164. This is also done in relation to the total damping contribution (both P and Q), which relates to the total current in the converter.

So, if generation of the damping power results in a maximum permissible current, the weighting function (weighting unit 172) allows to select the weighting between active and reactive power.

According to an embodiment, the weighted response function 174, 175 for the active power P and the reactive power Q, respectively, are used as damping control signal 132. According to another embodiment, the weighted response signals 174, 175 of the active and reactive power P, Q are further modified to yield the damping control signal 132. For example, in an embodiment a supervisory control unit 176 is provided which provides further control signals regarding the active power P and the reactive power Q. The further control signals may be merged with the response signals 170, 171 of the first and second subcontroller 162, 164, or with a respective modified response signal, 174, 175. For example, in an embodiment, a first summing point 177 is provided, which receives as an input the modified response signal 174 for the active power P and a further control signal 178 for the active power P, the further control signal 178 being provided by the supervisory control unit 176. In response to the received input signals 174, 178, the first summing point 177 provides a damping control signal 132a for the active power P. Accordingly, the supervisory control unit 176 provides a further control signal 179 for the reactive power Q. A second summing point 180 is provided for receiving the further control signal 179 for the reactive power as well as the modified response signal 175 for the reactive power and provides in response hereto, a damping control signal 132b for the reactive power Q. The damping control signals 132a, 132b as well as the oscillation flag 160 may be provided at respective terminals 181a, 181b, 161, the terminals forming the output 130 of the controller 122.

Having regard to the overall operation of the controller 122, according to embodiments the input signal 126 can be either be a local signal from the wind power park 100, 200 or can be delivered from a remote location, e.g. from the electricity network 128 with a respective communication link, e.g. a high-speed communication link. The input signal 126 may for example be indicative of at least one of: a bus frequency, a line current, a line power, etc. According to an embodiment, a remote input signal 126 may include one or more of the following: generator speed, active power on an interconnector, etc. The input signal 126 is first passed through a conditioning unit 154, the design of which depends on the input signal. The conditioning unit 154 removes measurement noise and extracts the power oscillation from the input signal.

The two parallel subcontrollers 162, 164 are used to independently determine the active and the reactive power modulation. The independent control of active and reactive power has the advantage that these signals can be computed independently, of course within the various limits of the components in the wind turbine. After an optional weighting and/or combining operation, the signal is provided as damping control signal to the individual wind turbine devices which are configured for receiving such a damping control signal and controlling a converter thereof accordingly.

Figure 5:
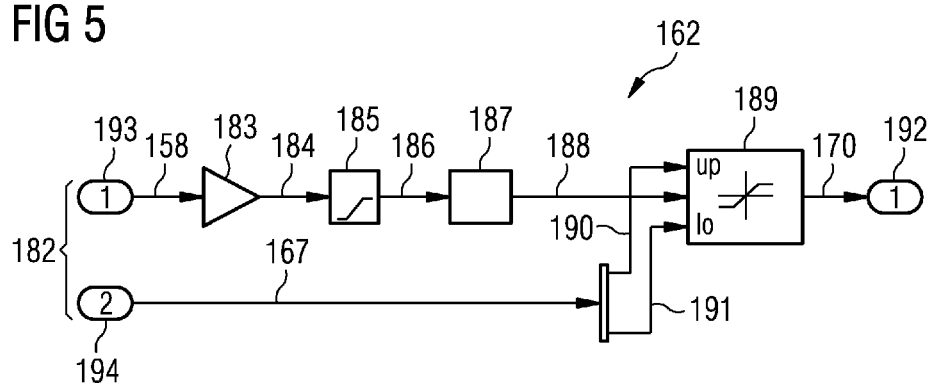
FIG. 5 shows the subcontroller 162 of FIG. 4 in more detail.

FIG. 5 shows the first subcontroller 162 of FIG. 4 in greater detail. It should be understood, that in an embodiment the second subcontroller 164 in FIG. 4 could be configured accordingly.

According to an embodiment, the subcontroller 162 has an input 182 for receiving the conditioned oscillation indicating signal 158. The conditioned oscillation indicating signal 158 is received by an amplifier 183 which provides in response hereto an amplified oscillation indicating signal 184. The amplified oscillation indicating signal 184 is received by a wash out circuit 185 which provides in response hereto a pre-conditioned oscillation indicating signal 186. In an embodiment, the wash-out filter is configured to remove any DC (steady state) component that might be present in the input signal. The damping controller should only respond to oscillations, hence, all DC components are removed from the input signal in this embodiment. The pre-conditioned oscillation indicating signal 186 is in one embodiment received by a phase compensation filter stage 187 comprising at least one phase compensation filter. In an embodiment, the phase compensation filter is a lead/lag filter. In an embodiment, the phase compensation filter is configured is to ensure that the phase difference between the input signal, i.e. the oscillation indicating signal 158 and the output signal 188 is such that the resulting Delta P and/or Delta Q increases the damping of the oscillation.

A further filter 189 is provided, the further filter 189 maintaining the output signal 188 which is indicative of the damping power to be provided, within an upper limit up and a lower limit lo. The upper and lower limit are set by respective limit set point signals 190, 191, which are extracted from the limiting signal 167. The further filter 189 provides, in response to the limit set point signals 190, 191 and the output signal 188, the response signal 170 already discussed with regard to FIG. 4. This response signal 170 may be provided at an output terminal 192 of the conditioning unit 162. For receiving the input signals, namely the conditioned oscillation indicating signal 158 and the limiting signal 167 in one embodiment, respective input terminals 193, 194 may be provided.

Having now again regard to FIG. 4, the changes in the set points of the power due to the damping action, ΔP and ΔQ, which are provided by the respective damping control signals 132a, 132b are in an embodiment transmitted to the device controller 152 (see FIG. 2) of the individual wind turbines which regulates the active and reactive power output accordingly. The damping torque/damping power from the reactive power modulation, ΔQ, is handled directly from the network side converter in one embodiment. This network side converter is indicated at 106 in FIG. 1 and FIG. 2. It should be noted, that according to embodiments of the herein disclosed subject-matter, the wind turbine devices may include further converters which are coupled in the power path between the power generator 104 and the network side converter 106. In other embodiments, such further converters are omitted. It should be understood that the regulation of the active power P and the reactive power Q is subject to the power capability of the active power P and the reactive power Q of the converter and its current operating point.

In general, a wind turbine is preferably not operated such that additional active power can be delivered, since curtailed production is undesirable as the fuel of the wind turbine, i.e. the wind, is free of charge.

However, delivery of damping torque/damping power from the active power modulation by the converter device 106 is only associated with delivery of active power when the power system is perturbed from its steady state. In the steady state, where no power oscillation in the electricity network takes place, no additional active power is delivered due to an operation of the damping controller 122. In a simple embodiment this is indeed achieved by operating the wind turbine device or the wind power park at a curtailed power production and thereby have a predetermined amount of active power available for the controller 122. However, as mentioned above, this may be undesirable. Hence, in another embodiment the rotational speed reference of the mechanical system of the generator 104 is changed by the device controller 152 in order to extract or deposit energy from the control action, i.e. from the modulation of the electrical output power of the converter device 106. Therefore, in this embodiment the controller 122 utilizes the rotational energy stored in the mechanical system of the power generator 104, in particular the energy stored in the rotation of the rotating element 140, as a storage from where the damping power can be exchanged. The oscillatory nature of the modulation of the electrical output power means that the net energy in the modulated active power will be low or even negative. When positive active power is required, energy is drawn from the rotational system, e.g. from the rotation element 140, whereas the rotational speed of the mechanical system, e.g. of the rotation element 140, is increased in the half cycle where negative damping power is injected.

Figure 6:
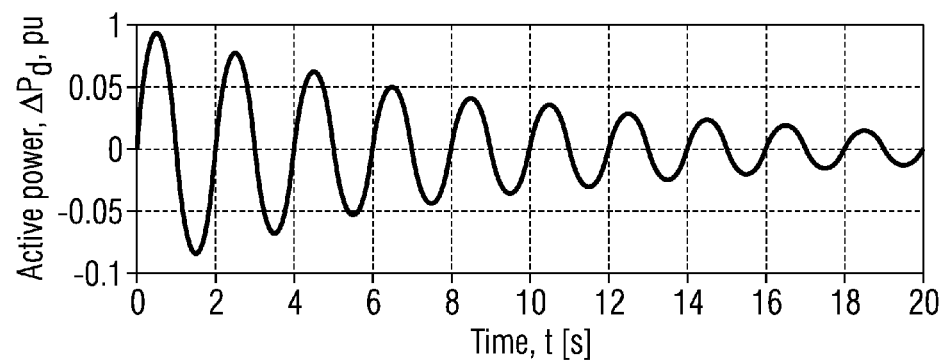
FIG. 6 shows the active power $\Delta P_d$ per unit (pu) for a damping operation of a wind turbine device according to embodiments of the herein disclosed subject-matter.

FIG. 6 shows the active power $\Delta P_d$ per unit (pu) for a typical damping operation of a wind turbine device according to embodiments of the herein disclosed subject-matter. As can be seen, the damping oscillation of the active power has an amplitude of about 0.1 per unit, i.e. about 10% of the rated active power of the wind turbine device. As can be further seen in FIG. 6, the amplitude decreases with time meaning that the power oscillation in the electricity network decreases and hence also the modulation of the electrical output power for damping the power oscillation decreases in amplitude.

Figure 7:
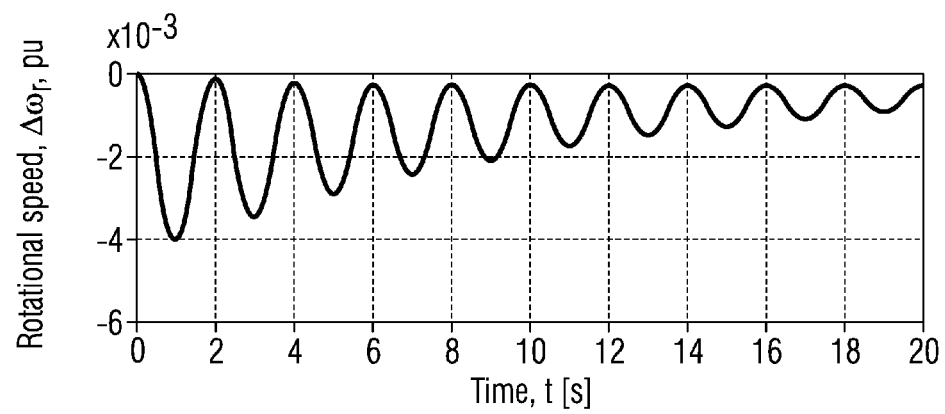
FIG. 7 shows the rotational speed $\Delta \omega_r$ of the rotation element of the power generator per unit (pu)$\times 10^{-3}$ for the damping operation shown in FIG. 6.

FIG. 7 shows the rotational speed $\Delta\omega_r$ of the rotation element 140 of the power generator per unit (pu)×$10^{-3}$. As can be seen, in accordance with an embodiment the rotational speed is at the rated speed and the deviation is 0. Upon initiating a modulation of the electrical output power, the rotational speed of the rotating element 140 and hence of the rotor 136 (see FIG. 2) of the wind turbine device is decreased in order to allow the additional power between the two rotational states to be fed to the converter device 106 and thus to be output at the power output 108 in order to provide the active power modulation shown in FIG. 6. In accordance with the decreasing amplitude of the active power modulation $\Delta P_d$ in FIG. 6, also the amplitude of the rotational speed differences decreases with time as shown in FIG. 7. Further, the difference in rotational speed between the actual rotational speed and the rated rotational speed tends to vanish with time to the same extent as the power oscillation in the electricity network vanishes. In an embodiment, In the actual rotational speed is controlled by the wind turbine control. The speed deviation in FIG. 7 will reduce up to a steady state value, which represents the net amount of energy extract from the rotor. And this steady state deviation from nominal speed is removed with control.

Figure 8:
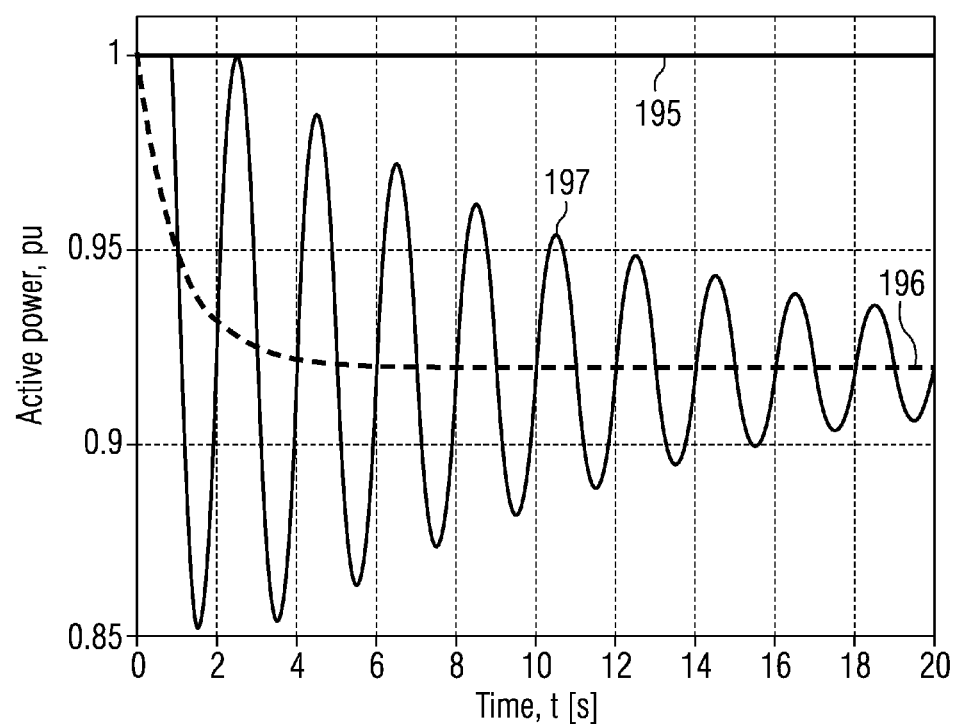
FIG. 8 shows an embodiment, where the rotational speed of the mechanical system of the wind turbine device is not changed due to the modulation of the electrical output power provided by the wind turbine device.

FIG. 8 shows an embodiment, where the rotational speed of the mechanical system of the wind turbine device, i.e. the rotational speed of the rotor 136 and the rotating element 140 is not changed due to the modulation of the electrical output power provided by the wind turbine device. In order to nevertheless allow the modulation of the electrical output power, the reference value (i.e. the set point) for the active power, indicated at 196 in FIG. 8, is decreased upon detection of a power oscillation in the electricity network from the rated active power (1 pu, indicated at 195 in FIG. 8) to about 0.92 in the exemplary embodiment. This reduction of the active power reference 196 in FIG. 8 is done in the initial phase of the response, i.e. in the initial phase of the active power modulation. The resulting (modulated) output power, that is provided at the power output 108, is indicated at 197 in FIG. 8. That is, in this initial phase, up to about 2 seconds in the exemplary embodiment, mainly negative response is delivered. As can be seen from FIG. 8, the initial damping torque/damping power delivered by this approach would be less since only the negative response is utilized in the initial state. However, after 2 seconds in the respective embodiment the modulation of the output power, indicated at 197, is available for the positive as well as the negative half cycle. Again, as already discussed with FIG. 6 the amplitude of the modulation of the output power, indicated at 197 in FIG. 8, decreases with time as the power oscillation in the electricity network also decreases. The reference 196 of the active power as well as the actually outputted active power 197 is given per unit (pu) in FIG. 8. The rated power of the wind turbine device has a value of 1 per unit (pu).

According to embodiments of the invention, any suitable component of the wind turbine device or the wind park, e.g. the controller 122 or the device controller 152 are provided in the form of respective computer program products which enable a processor device to provide the functionality of the respective elements as disclosed herein. According to other embodiments, any component of the wind turbine device or the wind park, e.g. the controller 122 or the device controller 152 may be provided in hardware. According to other-mixed-embodiments, some components may be provided in software while other components are provided in hardware. Further, it should be noted that a separate component (e.g. module) may be provided for each of the functions disclosed herein. According to other embodiments, at least one component (e.g. a module) is configured for providing two or more functions as disclosed herein.

It should be noted that the term "comprising" does not exclude other elements or steps and the "a" or "an" does not exclude a plurality. Also elements described in association with different embodiments may be combined. It should also be noted that reference signs in the claims should not be construed as limiting the scope of the claims.

In order to recapitulate the above described embodiments of the present invention one can state:

There is provided a power generation park comprising a power output for providing electrical output power to an electricity network. A power generation device comprises a converter device configured for receiving input power from a power generator and providing, in response hereto, the electrical output power to the power output. The power generation park further comprises a controller being configured for receiving an oscillation indicating signal indicative of a power oscillation in the electricity network, the controller being further configured for providing a damping control signal in response to the oscillation indicating signal; the converter device being configured for modulating the electrical output power in response to the damping control signal so as to damp the power oscillation in the electricity network. In an embodiment, active power and reactive power are modulated independently. In accordance with a further embodiment, the controller is part of the power generation device.

LIST OF REFERENCE SIGNS 100, 200 power generation park (e.g. wind park)
102a, . . . 102n power generation device (e.g. wind turbine device)
104 power generator
106 converter device
108 power output
110 coupling path
112 output of 106
114 device transformer
116 bus bar
118 park transformer
120 interface
122 controller
124 input of 122
126 oscillation indicating signal
128 electricity network (e.g. external grid)
130 output of 122
132 damping control signal
134 measuring device
136 rotor
138 shaft
140 rotation element
142 electrical power
144 output of 104
146 input of 106
112 output of 106
150 electrical output power
152 device controller
154 input conditioning unit
156 input of 154
157 output of 154
158 conditioned oscillation indicating signal
159 flag output
160 oscillation flag
161 flag terminal
162 first subcontroller
164 second subcontroller
166 limiting unit
167 first limit
168 second limit
170 first response signal
171 second response signal
172 weighting unit
174 weighted response signal for the active power (P)
175 weighted response signal for the reactive power (Q)
176 supervisory control unit
177 first summing point
178 further control signal
179 further control signal
180 second summing point
181a terminal for response signal for the active power
181b terminal for response signal for the reactive power
182 input of 162
183 amplifier
184 amplified oscillation indicating signal
185 wash-out circuit
186 pre-conditioned oscillation indicating signal
187 phase compensation filter stage
188 output signal of 187, indicative of damping power to be provided
189 further filter
190, 191 set point signal
192 output terminal
193, 194 input terminal of 189
195 rated active power of converter device 106
196 set point for active power
197 modulated output power provided at the power output 108

The invention claimed is:
1. A power generation device comprising:
a power generator; and
a converter device having a power output for providing electrical output power to an electricity network, wherein the converter device is configured to receive input power from the power generator and to provide, in response thereto, the electrical output power at the power output, and wherein the converter device is configured to modulate the electrical output power in response to a damping control signal so as to damp a power oscillation in the electricity network, wherein the converter device comprises a device controller configured to receive the damping control signal and to control, in response thereto, elements of the converter device, wherein the device controller is configured to cause a rotational speed reference of a mechanical system of the power generator to change in order to extract or deposit energy from the modulation of the electrical output power of the converter device.

2. The power generation device according to claim 1, wherein the damping control signal includes a control signal for controlling an active component of the electrical output power.

3. The power generation device according to claim 1, wherein the damping control signal includes a control signal for controlling a reactive component of the electrical output power.

4. The power generation device according to claim 1, wherein the mechanical system of the power generation device comprises a rotary machine, the rotary machine having a rotation element, and wherein the converter device modulates the electrical output power in response to the damping control signal so as to change the rotational energy of the rotation element.

5. The power generation device according to claim 1, wherein the power generation device is a wind turbine device.

6. The power generation device according to claim 1, further comprising:

a controller configured to receive an oscillation indicating signal indicative of a power oscillation in the electricity network, and configured to provide the damping control signal in response to the oscillation indicating signal.

7. A power generation park, comprising:

at least two power generation devices of which at least one power generation device is configured according to claim 1.

8. The power generation park as claimed in claim 7, further comprising:

a controller configured to receive an oscillation indicating signal indicative of a power oscillation in the electricity network, and configured to provide the damping control signal in response to the oscillation indicating signal.

9. A method of operating a controller of a converter device configured for providing an electrical output power to an electricity network, the method comprising:

receiving an oscillation indicating signal, indicative of a power oscillation in the electricity network; and providing a damping control signal to the converter device in response to the oscillation indicating signal, wherein the damping control signal is configured: so as to drive the converter device to modulate the electrical output power of the converter device and thereby damp the power oscillation in the electricity network; and so as to drive the converter device to exchange power between the electricity network and a rotary machine of a power generation device by changing the rotational energy of a rotation element of the rotary machine, changing a rotational speed reference of the rotation element in order to extract or deposit energy from the modulation of the electrical output power of the converter device.

10. The method according to claim 9, further comprising:

decreasing, in response to the oscillation indicating signal, a reference value of an active power to be provided by the converter.

* * * * *